United States Patent [19]

Kubo et al.

[11] 4,395,926

[45] Aug. 2, 1983

[54] HYDRAULIC CONTROL SYSTEM FOR AUTOMATIC TRANSMISSION

[75] Inventors: Seitoku Kubo; Yukio Terakura; Shinya Nakamura, all of Toyota; Ken Asami, Nagoya, all of Japan

[73] Assignees: Toyota Jidosha Kogyo Kabushiki Kaisha; Aisin Warner Kabushiki Kaisha, both of Aichi, Japan

[21] Appl. No.: 178,433

[22] Filed: Aug. 15, 1980

[30] Foreign Application Priority Data

Aug. 21, 1979 [JP] Japan .................................. 54-106790
Nov. 29, 1979 [JP] Japan .................................. 54-154885

[51] Int. Cl.³ .......................... B60K 41/16; F16H 5/64
[52] U.S. Cl. ..................................................... 74/869
[58] Field of Search ........................... 74/867, 868, 869

[56] References Cited

U.S. PATENT DOCUMENTS 4,143,563 3/1979 Shindo et al. ........................... 74/869
4,186,627 2/1980 Kuramochi ............................ 74/869

FOREIGN PATENT DOCUMENTS 53-141868 12/1978 Japan ..................................... 74/869

*Primary Examiner*—Allan D. Herrmann
*Attorney, Agent, or Firm*—Oblon, Fisher, Spivak, McClelland & Maier

[57] ABSTRACT

A hydraulic control system for an automatic transmission including a fluid coupling type torque converter, and a gear system provided with two or more frictional devices adapted to establish two or more speed conditions. The hydraulic control system includes a hydraulic pressure source, a line pressure control valve receiving pressure from the hydraulic pressure source to generate a regulated line pressure, a throttle pressure control valve for generating a throttle pressure commensurate with the intake throttle opening, a governor pressure control valve for generating a governor pressure commensurate with the vehicle speed, a detent regulator valve receiving the line pressure to generate a regulated detent pressure, a manual valve for enabling manual shifts of the transmission, two or more shift valves for shifting the paths of the line pressure to the frictional engaging devices in response to the opposingly acting forces of the throttle pressure and governor pressure, the shift valves including one shift valve operative to establish the highest speed ratio for the transmission, and a control valve provided in the shift valve for the highest speed ratio and adapted to draw in the detent pressure when the intake throttle valve is opened substantially to a full extent, in a manner to offset the throttle pressure acting on the highest shift valve, thereby controlling the highest shift valve according to a balancing relation between the detent pressure and the governor pressure.

2 Claims, 4 Drawing Figures

HYDRAULIC CONTROL SYSTEM FOR AUTOMATIC TRANSMISSION

BACKGROUND OF THE INVENTION

1. Field of the Invention

This invention relates to a hydraulic control system for vehicular automatic transmission.

2. Description of the Prior Art

In the vehicular automatic transmission having a fluid coupling type torque converter and a transmission gear mechanism with a plural number of friction elements to establish a number of speed ratios, the gear mechanism is automatically shifted into a speed ratio optimum for the current operating condition by applying and releasing the respective friction elements in predetermined modes of operation. The friction elements are controlled by a hydraulic control system incorporating a number of shift values which are operated according to antagonistically acting forces of a throttle pressure varying in response to the intake throttle opening and a governor pressure varying in response to the vehicle speed. The hydraulic control system of this sort generally incorporates a manual selector valve for manually switching the operating range of the transmission each range defining a speed ratio to which the transmission is shiftable, namely, the maximum speed ratio to which the transmission is shiftable. The operating ranges selectable by the manual selector valve normally include a number of forward ranges such as D-range, 2nd range and L-range. For example, when the manual selector valve is in D-range position, the transmission is shifted over a wide range of speed, from 1st to a maximum speed ratio rated for the transmission, normally 3rd or 4th speed.

In a case where the transmission has four forward speeds including overdrive (4th speed), the conventional hydraulic control system are designed to effect the upshift from 3rd to 4th speed and the downshift from 4th to 3rd speed at shift points which are determined solely by the throttle opening as shown in FIG. 1, holding 3rd speed irrespective of the vehicle speed in an operating condition close to a full throttle opening area A. However, it is desired to effect shifts between 3rd and 4th speeds even in the full throttle opening area in order to prevent overrunning of the engine which occurs when the gear mechanism is shifted from 4th to 3rd speed of a greater reduction ratio due to an abruptly increased throttle opening (the so-called 4-3 kickdown) during overdrive operation, for the purpose of improving the performance quality of the vehicle at high speeds.

In the conventional hydraulic control system, the shift points to and from 3rd and 4th are determined by the acting areas of the throttle and governor pressures on the valve body of the highest 3-4 shift valve, and at the time of kickdown the valve body is operated by the throttle and detent pressures acting against the governor pressure. The governor pressure increases in proportion to the vehicle speed in low and middle speed ranges but its increase is limited in the high speed range due to oil leakage, so that it becomes difficult to obtain a governor pressure which is high enough for effecting the 3-4 upshift in the full throttle area A of FIG. 1 at a point over the ordinary shift points in the lower throttle opening area. On the contrary, if it is arranged to effect the 3-4 upshift in the full throttle opening area A, the shift points in the smaller throttle opening area have to be lowered to unduly low levels.

SUMMARY OF THE INVENTION

It is an object of the present invention to provide a hydraulic control system for fluid coupling type automatic transmission, which overcomes the above-mentioned difficulty.

It is a more particular object of the present invention to provide a hydraulic control system of the class mentioned above, which is capable of effecting shifts to and from 3rd and 4th speeds during operations in the full throttle opening area.

It is another object of the present invention to provide a hydraulic control system of the class mentioned above, which contributes to improve the performance quality of the vehicle at high speeds and to prevent overrunning of the engine.

According to the present invention, there is provided a hydraulic control system for an automatic transmission including a fluid coupling type torque converter and a gear system with a number of friction elements to establish two or more speed ratios, the hydraulic control system comprising: a hydraulic pressure source; a line pressure control valve receiving pressure from the hydraulic pressure source to generate a regulated line pressure; a throttle valve for generating a throttle pressure varying commensurated with the intake throttle opening; a governor valve for generating a governor pressure varying commensurate with the vehicle speed; a manual selector valve for manually switching the operating range of the transmission; a plural number of shift valves operable for switching paths of pressure to servo mechanisms for the respective friction elements under the influence of antagonistically acting forces of the throttle and governor pressures; and a detent regulator valve for generating a detent pressure to be drawn to the shift valves at the time of kickdown; the detent pressure being drawn to the highest one of the shift valves in a manner to offset the action of the throttle pressure and in a contrapositive relation with the governor pressure.

The above and other objects, features and advantages of the invention will become apparent from the following description and the appended claims, taken in conjunction with the accompanying drawings which show by way of example one preferred embodiment of the invention.

DETAILED DESCRIPTION OF PREFERRED EMBODIMENT

Figure 1:
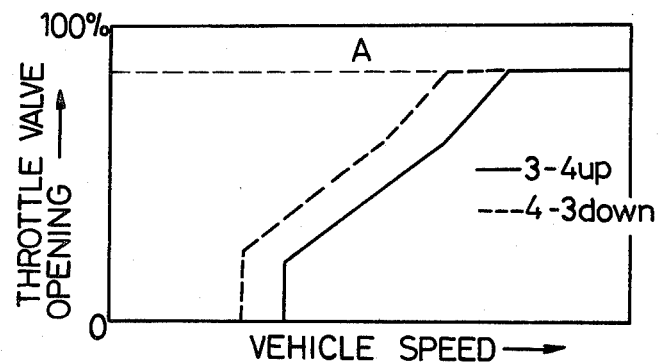
FIG. 1 is a graphic illustration of shift lines between 3rd and 4th speeds as attained by a conventional hydraulic control system.
Figure 2:
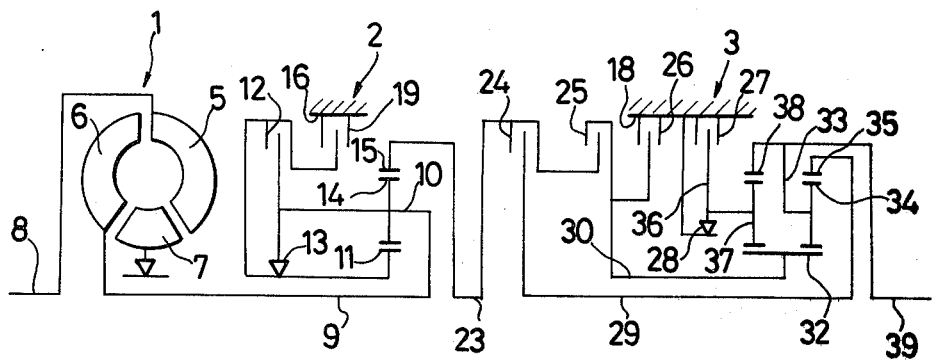
FIG. 2 is a skeletonized view of an automatic transmission.
Figure 3:
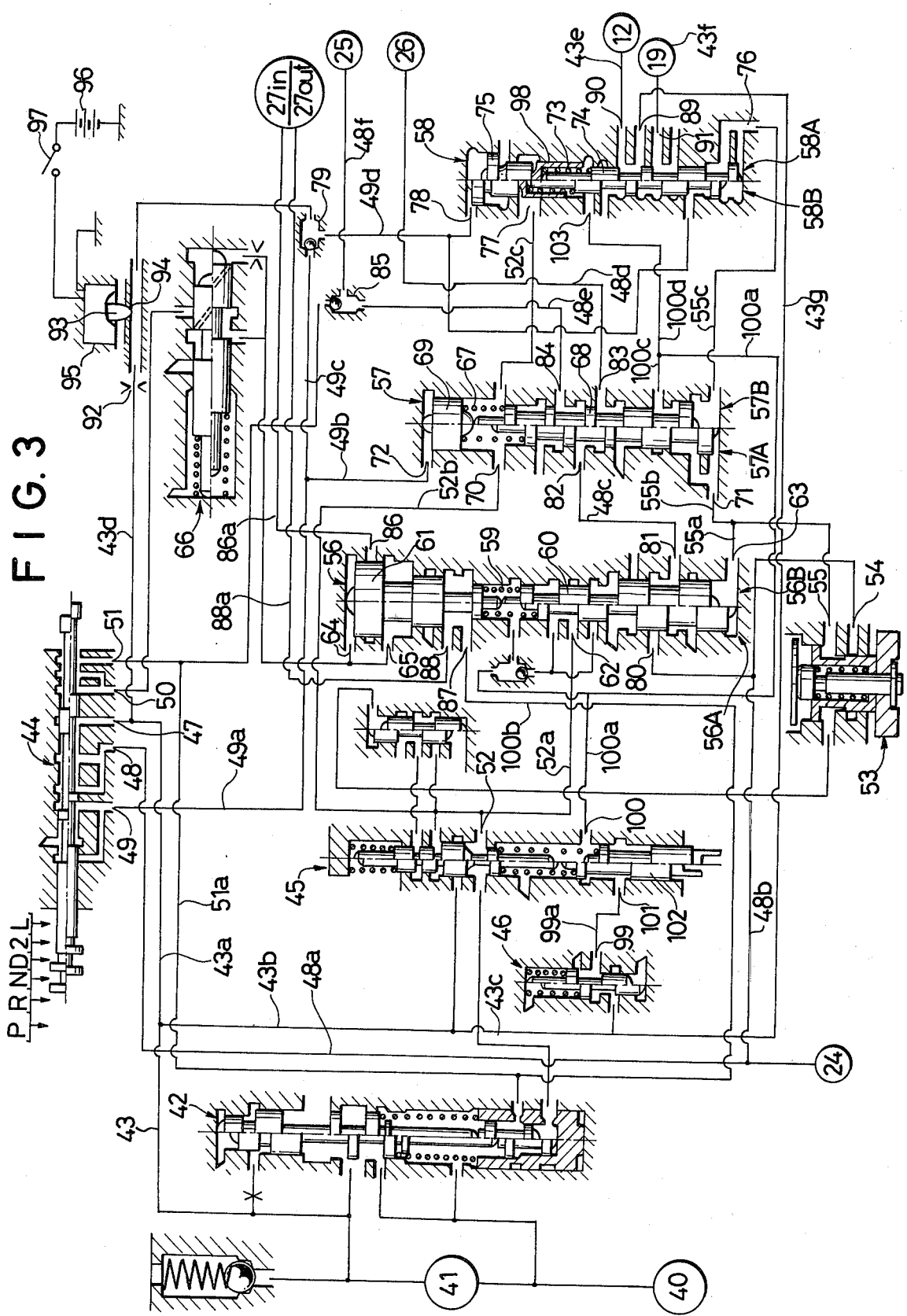
FIG. 3 is a schematic diagram of a hydraulic control system according to the present invention.

FIG. 2 illustrates in schematic diagram one example of a fluid coupling type automatic transmission with an overdrive mechanism, the transmission providing four forward speeds including overdrive and one reverse speed. The transmission, which includes a torque converter 1 and a transmission gear mechanism 3 for three forward and one reverse speeds, is controlled by a hydraulic control system as shown in FIG. 3. The torque converter 1 is of the known type and includes a pump 5, a turbine 6 and a stator 7. The pump 5 and turbine 6 are coupled with a crank shaft 8 and a turbine shaft 9, respectively. The turbine shaft 9 which constitutes an output shaft of the torque converter 1 also serves as an input shaft for the overdrive mechanism 2, and is coupled with a carrier 10 of a planetary gear system of the overdrive mechanism 2. A planetary pinion 14 which is rotatably supported by the carrier 10 is meshed with a sun gear 11 and a ring gear 15. A multiple disc clutch 12 and a one-way clutch 13 are provided between the sun gear 11 and carrier 10. On the other hand, a multiple disc brake 19 is provided between the sun gear 11 and a housing of the transmission including the overdrive mechanism or an overdrive case 16.

The ring gear 15 of the overdrive mechanism 2 is coupled with an input shaft 23 of the transmission gear mechanism 3. A multiple disc clutch 24 is provided between the input shaft 23 and an intermediate shaft 29, while a multiple disc clutch 25 is provided between the input shaft 23 and a sun gear shaft 30. A multiple disc brake 26 is provided between the sun gear shaft 30 and the transmission case 18. A sun gear 32 which is provided on the sun gear shaft 30 for two rows of planetary gear trains, one with a carrier 33, a planetary pinion 34 supported by the carrier 33 and a ring gear 35 meshed with the pinion 34 and the other one with a carrier 36, a planetary pinion 37 supported by the carrier 36 and a ring gear 38 meshed with the pinion 37. The ring gear 35 of one planetary gear train is coupled with the intermediate shaft 29. Whereas the carrier 33 of this planetary gear train is coupled with the ring gear 38 of the other planetary gear train, both the carrier 33 and ring gear 38 being coupled with an output shaft 39. A multiple disc brake 27 and a one-way clutch 28 are provided between the carrier 36 of the other planetary gear train and the transmission case 18.

The above-described fluid coupling type automatic transmission with an overdrive mechanism is operated by a hydraulic control system which applies and releases the respective clutches and brakes according to the engine output and the vehicle speed to provide four forward speeds including overdrive range (O.D.) by automatic shifting and one reverse speed by manual shifting.

Table 1 below shows the various gear positions in relation with the conditions of the respective clutches and brakes.

TABLE 1

| Shift position | | | Friction Elements | | | | | | |
|---|---|---|---|---|---|---|---|---|---|
| | | | Clutch 12 | Clutch 24 | Clutch 25 | Brake 19 | Brake 26 | Brake 27 | One-way clutch 13 | One-way clutch 28 |
| Parking | | | O | X | X | X | X | O | — | — |
| Reverse | | | O | X | O | X | X | O | Lock | Lock |
| Neutral | | | O | X | X | X | X | X | — | — |
| Forward | D-range | 1st | O | O | X | X | X | X | Lock | Lock |
| | | 2nd | O | O | X | X | O | X | Lock | Over-run |
| | | 3rd | O | O | O | X | X | X | Lock | Over-run |
| | | O.D. | X | O | O | O | X | X | Over-run | Over-run |
| | 2nd range | 1st | O | O | X | X | X | X | Lock | Lock |
| | | 2nd | O | O | X | X | O | X | Lock | Over-run |
| | L-range | | O | O | X | X | X | O | Lock | Lock |

In Table 1, the symbol "O" indicates an applied state of a clutch or brake while the symbol "X" indicates a released state of a clutch or brake.

FIG. 3 is a schematic diagram of a hydraulic control system according to the present invention, which is adapted to control the automatic transmission of FIG. 2. The oil which is pumped out of an oil reservoir 40 by an oil pump 41 is fed to a regulator valve 42 which generates a regulated line pressure P1 of a predetermined level in conduit 43. The line pressure is supplied to a manual selector valve 44 via conduit 43a and at the same time to a throttle valve 45 and a detent valve 46 via conduits 43b and 43c. As is well known in the art, the manual selector valve 44 is switchable to and from parking (P), reverse (R), neutral (N), D-range (D), 2nd range (2) and L- or 1st range (L or 1). Depending upon the change-over position of the manual selector valve 44, the line pressure applied to its input port 47 selectively appears at its output ports 48 to 51 as shown in Table 2 below.

TABLE 2

| Output port | Shift Positions | | | | | |
|---|---|---|---|---|---|---|
| | P | R | N | D | 2 | L |
| 48 | — | — | — | O | O | O |
| 49 | — | — | — | — | O | O |
| 50 | O | O | — | — | — | O |
| 51 | — | O | — | — | — | — |

The throttle valve 45 generates at its output port 52 a throttle pressure commensurate with the extent of the accelerator pedal depression or the throttle opening. The output port 48 of the manual selector valve 44 communicates with the clutch 24 (forward clutch) via conduit 48a and with input port 54 of a governor valve 53 via branched conduit 48b. Receiving the line pressure at its input port 54, the governor valve regulates it according to the vehicle speed to produce at its output port 55 a governor pressure Pgo varying commensurate with the vehicle speed.

The detent valve 46 regulates the received line pressure into a predetermined detent pressure which is lower than the line pressure and supplies the same via output port 99 and conduit 99a. The detent pressure produced in conduit 99a is supplied to the respective shift valves according to the movements of the kickdown valve 102 of the throttle valve 45. More particularly, when the vehicle is operated in the full throttle area with the accelerator pedal depressed to a large extent, holding the kickdown valve 102 in the upper position, the input and output ports 101 and 100 of the detent valve are communicated with each other to supply the detent pressure via conduits 100a, 100b, 100c and 100d to a 1-2 shift valve, a 2-3 shift valve, a 3-4 shift valve or overdrive control valve which will be described hereinlater. On the other hand, when the throttle opening is not in the fully opened area, the kickdown valve 102 of the throttle valve blocks the inlet port 101 to cut off the supply of detent pressure to the abovementioned conduits 100a and so forth.

The reference numerals 56, 57 and 58 denote a 1-2 shift valve, a 2-3 shift valve and an overdrive control valve (or a 3-4 shift valve), respectively. The 1-2 shift valve 56 includes two valve bodies 60 and 61 which are axially opposed through a compression spring 59. The valve 60 is displaceable between a lower position 56A and an upper position 56B under the influence of opposingly acting forces, i.e., the downward force exerted by the spring 59 and the throttle pressure Pth drawn to port 62 through conduit 52a and the upward force exerted by the governor pressure Pgo drawn to port 63 at the lower end through conduit 55a. When the manual selector valve 44 is switched to L-range position, the line pressure appearing at its output port 50 is fed to ports 64 and 65 of the valve 61 after regulation through a low coast modulator valve 66, whereupon the valve 61 is displaced downward in FIG. 3 to forcibly retain the valve 60 the lower position (56A).

Similarly, the 2-3 shift valve 57 has two valve bodies 68 and 69 which are opposed axially through a compression spring 67. The valve 68 is likewise displaceable between a lower position 57A and an upper position 57B under the influence of opposingly acting forces, i.e., the downward force exerted thereon by the coil spring 67 and the throttle pressure Pth drawn to port 70 via conduit 52 vs. the upward force exerted thereon by the governor pressure Pgo drawn to port 71 at the lower end through conduit 55b. When the manual selector valve 44 is switched to 2nd range position, the line pressure appearing at its output port 49 is drawn through conduits 49a and 49b and port 72 to act on the upper end face of the valve body 69, urging the latter downward to retain the valve body 69 forcibly in the lower position 57A.

In this embodiment, the 3-4 shift valve which is the overdrive control valve 58 has a valve body 74 and a piston 75 which are opposed axially through a compression spring 73 and a 3rd coast valve 98, the valve body 74 receiving at its lower end the governor pressure Pgo through conduit 55c and port 76. The valve body 74 also receives at its upper end the throttle pressure Pth which is supplied through conduit 52c and port 77. When the manual selector valve 44 is switched to 2nd or L-range position, the port 78 receives either the line pressure which fed from output port 49 of the manual selector valve 44 via conduits 49a and 49c, shuttle valve 79 and conduit 49d, or a pressure which is supplied through conduit 43d, shuttle valve 79 and conduit 49d and which is of a level equivalent to or lower than the line pressure. When the pressure prevailing at port 78 is substantially lower than the line pressure as mentioned above, the piston 75 is held in its upper position by the action of the spring 73 and the valve body 74 is displaceable between its upper and lower positions 58B and 58A according to the antagonism between the throttle pressure drawn through port 77 to act on the upper end of the valve body and the governor pressure drawn through port 76 to act on the lower end of the valve body.

When the detent pressure is supplied between the 3rd coast valve 98 and the valve body 74 via detent pressure input port 103, the 3rd coast valve 98 is subjected to the throttle and detent pressures on its upper and lower sides, respectively, while the valve body 74 is subjected to the detent and governor pressures on its upper and lower sides. Thus, the valve body 74 switches the oil paths according to the antagonism of the detent and governor pressures. However, as described hereinafter, when port 78 receives the line pressure which is substantially higher than the detent pressure, the piston 75 is pushed downward in FIG. 3 to hold the valve body 74 forcibly in the lower position 58A irrespective of the governor pressure acting at the lower end thereof.

When the manual selector valve 44 is in the D-range position, port 80 of the 1-2 shift valve is supplied with the line pressure via conduit 48b. If the 1-2 shift valve in the upper position 56B, the line pressure is led to port 82 of the 2-3 shift valve 57 via port 81 and conduit 48c. If the 2-3 shift valve 57 is in its lower position 57A, the line pressure led to port 82 is supplied to the brake 26 (2nd brake) through port 83 and conduit 48d. If the 2-3 shift valve is in its upper position 57B, the line pressure fed to port 82 is led to port 84 and then to the shuttle valve 85 via conduit 48e for supply to the clutch 25 (reverse clutch) via conduit 48f. In this instance, as the manual selector valve 44 is switched to L-range position, the line pressure appearing at its output port 50 is fed to ports 64 and 65 of the 1-2 shift valve 56 through the low coast modulator valve 66, pushing down the valve body 61, and then to the inside port of the brake 27 (1st reverse brake) from port 86 via conduit 86a to apply the brake 27. When the manual selector valve 44 is switched to reverse range position, the line pressure appearing at the output port 51 is fed to the outside port of the brake 27 via conduit 51a, ports 87 and 88 of the 1-2 shift valve and conduit 88a to apply the clutch.

Port 89 of the overdrive control valve 58 is supplied with the line pressure through conduits 43b, 43c and 43g, which is fed to the clutch 12 of the overdrive mechanism via port 90 and conduit 43e when the overdrive control valve is in the lower position 58A and to the brake 19 of the overdrive mechanism via port 91 and conduit 43f when the control valve is in the upper position 58B.

A choke 92 is provided within the length of conduit 43d, which has a drain port 94 at a position downstream of the choke 92 and in association with a valve member 93 of a solenoid valve 95 which controls the opening and closure of the drain port 94. In this instance, the valve member 93 is constantly urged toward the drain port 94 by a spring (now shown), and lifted upward in FIG. 3 to open the drain port 94 upon energization of the solenoid 95 which is controlled by an electric circuit as shown in FIG. 3. The electric control circuit includes a power source 96 which may be the battery mounted on the vehicle. Indicated at 97 is a manual on-off switch which is inserted in the solenoid energizing circuit and selectively operated by a driver. When the manual switch 97 is open, the solenoid is deenergized and therefore the port 94 is closed by the valve member 93 as shown in FIG. 3. If the manual switch 97 is closed to energize the solenoid 95, the valve member 93 is lifted by the solenoid to open the drain port 94. The manual switch 97 which is selectively operated by the driver as mentioned hereinbefore may be arranged such that it is opened only when a button element is depressed or vice versa. Alternatively, the switch 97 may be realized in the form of a switch having on- and off-positions respectively indicative of on- and off-states of the overdrive mechanism. In this case, the switch 97 is closed when turned to on-position for actuating the overdrive mechanism and opened when turned to off-position for locking the overdrive mechanism.

The hydraulic control system of FIG. 3 operates as follows.

D-Range

When the manual selector valve 44 is switched to D-range position, the line pressure which appears only at port 48 is fed directly to clutch 24. At this time, if the vehicle is stopped or in a low coasting operation, the governor pressure produced by the governor valve 53 is low and the 1-2 shift valve 56, 2-3 shift valve 57 and overdrive control valve 58 are in the respective lower positions 56A, 57A and 58A. Therefore, the oil fed through conduit 48b is blocked at port 80 and not supplied to the reverse clutch 25 and second brake 26 which are located downstream. On the other hand, the oil which is led to port 89 of the overdrive control valve 58 via conduit 43g is supplied to the clutch 12 of the overdrive mechanism. Thus, the overdrive mechanism is in a locked state and the transmission gear mechanism is in first speed position.

In a general operating condition, the governor pressure is gradually increased in response to increases in the vehicle speed and the 1-2 shift valve is switched to the upper position 56B at a certain vehicle speed, drawing the line pressure to port 81, to ports 82 and 83 of the 2-3 shift valve 57, and then to the 2nd brake 26 via conduit 48d. In this state, the transmission gear mechanism is shifted to 2nd speed.

As the vehicle speed is further increased, the 2-3 shift valve 57 is also switched to its upper position 57B, supplying pressure from port 82 to port 84 and then to the reverse clutch 25 via conduit 48e. In this state, the transmission gear mechanism is shifted to 3rd speed.

With a further increase of the vehicle speed, the overdrive control valve 58 is also switched to the upper position 58B to supply the pressure from port 89 to port 91. In this state, the overdrive mechanism 2 is operated to establish an overdrive condition.

Although the shift operations are explained in relation with the increases in the vehicle speed in the foregoing description, it is to be understood that the shifts are effected according to the relation of a contrapositively acting governor and throttle pressures on the valve elements of the respective shift valves, that is to say, in relation not only with the vehicle speed but also with the extent of accelerator pedal depression.

When the vehicle speed is lowered, the overdrive control valve 58, 2-3 shift valve 57 and 1-2 shift valve 56 are shifted in that order to the respective lower positions 58A, 57A and 56A to shift the transmission accordingly.

Figure 4:
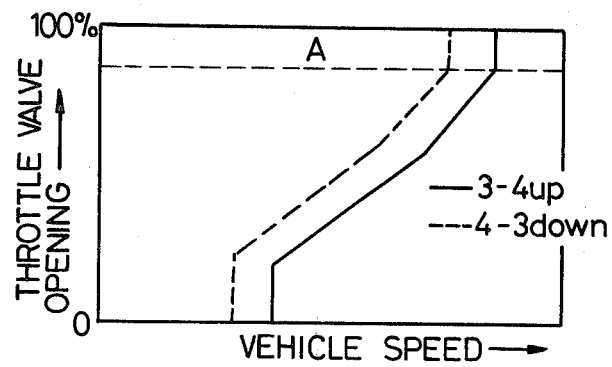
FIG. 4 is a graphic illustration of shift lines between 3rd and 4th speeds attained by the control system of FIG. 3.

When a detent pressure is produced in conduit 100a by an abrupt depression of the accelerator pedal during operation in 2nd speed, the valve body 60 is pushed down by the detent pressure fed to the 1-2 shift valve via conduit 100b to kick down to 1st speed. During operation in 3rd speed, the valve body 68 is pushed down by the detent pressure fed to the 2-3 shift valve via conduit 100c to kick down the gear ratio to 2nd speed. When the accelerator pedal is depressed to an extent for full throttle opening area during overdrive operation, the detent pressure is led to input port 103 of the overdrive control valve 58 via conduit 100d, pushing up the 3rd coast valve 98 from beneath to offset the throttle pressure which acts on the upper end of the 3rd coast valve 98 and at the same time pushing down the valve body 74 from above. As a result, the valve 74 is operated by the downwardly acting detent pressure and the upwardly acting governor pressure, and the shift points to and from 3rd and 4th speeds are determined solely according to variations in the governor pressure in the full throttle opening area A as shown in FIG. 4, irrespective of variations in the extent of throttle opening.

2nd Range

If the manual selector valve 44 is switched to 2nd range position, the line pressure appears at port 49 in addition to port 48 to supply the pressure to port 72 of the 2-3 shift valve via conduits 49a and 49b and at the same time to port 78 of the overdrive control valve 58 via conduit 49c, shuttle valve 79, and conduit 49d, forcibly holding the valves 57, 58 in the respective lower positions 57A and 58A. Therefore, the overdrive mechanism is securely retained in a locked state and the transmission gear mechanism is operated in 2nd or lower speed, namely, in 2nd or 1st speed alone.

L-Range

If the manual selector valve 44 is switched to L-range position, the line pressure also appears at its output port 50 and supplied to ports 64 and 65 of the 1-2 shift valve 56 through the low coast modulator valve 66 to forcibly retain the valve body 56 in its lower position 56A. In this state, the transmission gear mechanism is maintained in 1st speed.

As clear from the foregoing description, the hydraulic control system of the invention is arranged to draw a detent pressure into the highest shift valve in the full throttle opening area to offset the throttle pressure acting thereon so that the highest shift valve is operated by the detent and governor pressures, thereby allowing shifts to and from 3rd and 4th speeds during operation in the full throttle opening area while improving the performance quality of the vehicle at high speeds and preventing overrunning of the engine.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic control system for an automatic transmission including a fluid coupling type torque converter and a gear system with a number of friction elements to establish two or more speed ratios, said hydraulic control system comprising:
    a hydraulic pressure source;
    a line pressure control valve receiving pressure from said hydraulic pressure source to generate a regulated line pressure;
    a throttle valve for generating a throttle pressure varying commensurate with the intake throttle opening;
    a governor valve for generating a governor pressure varying commensurate with the vehicle speed;
    a manual selector valve for manual switching the operating range of the transmission;

a plurality of shift valves operable for switching paths of pressure to a servo mechanism for said friction elements under the influence of antagonistically acting force of said throttle and governor pressures wherein the shift valve operative to establish the highest speed ratio among said plurality of shift valves further comprises a first piston receiving the throttle pressure at the upper end thereof, a valve body receiving the governor pressure at the lower end thereof and a compression spring provided between said first piston and valve body; and a detent regulator valve for generating a detent pressure to be drawn to said shift valves at the time of kickdown;

said detent pressure being drawn between the lower end of said first piston and the upper end of said valve body of the shift valve operative to establish the highest speed ratio in a manner to offset said throttle pressure and in a contrapositive relation with said governor pressure.

2. A hydraulic control system for an automatic transmission according to claim 1, wherein the shift valve operative to establish the highest speed ratio further comprises a second piston provided axially with said first piston for receiving the line pressure on an upper end portion thereof in a contrapositive relation with said governor pressure and whereby said detent pressure is drawn between the lower end of said first piston and the upper end of said valve body in a manner to offset said throttle pressure and in contrapositive relation with said governor pressure and said line pressure is drawn to the upper end portion of said second piston when the manual selector valve is positioned in a second speed range or a low range.

* * * * *